Oct. 5, 1965  JEAN-BAPTISTE LOZACH  3,209,456
BUTTER CUTTING DEVICE
Filed Nov. 15, 1962
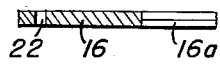  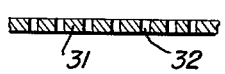
FIG.5  FIG.6  FIG.7
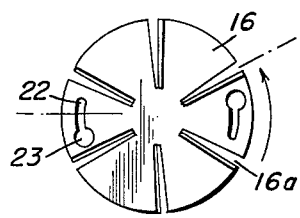 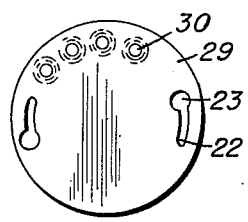 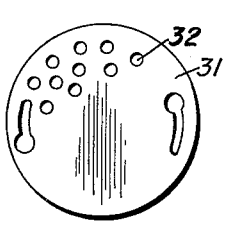
FIG.2  FIG.3  FIG.4
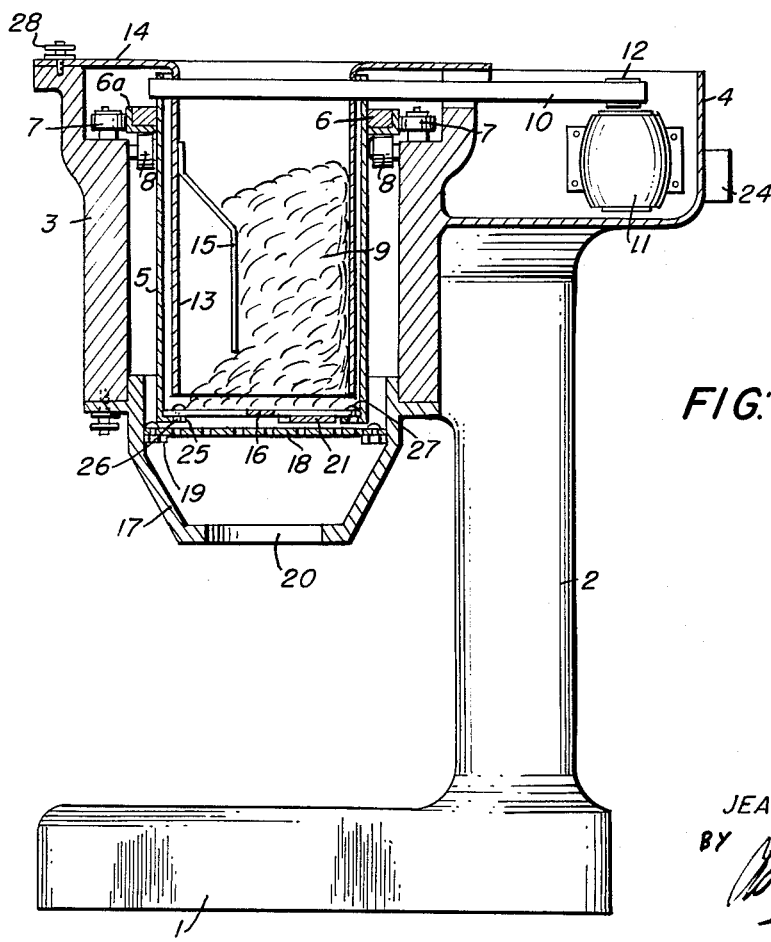
FIG.1
INVENTOR
JEAN-BAPTISTE LOZACH
BY
ATTORNEYS

United States Patent Office 3,209,456
Patented Oct. 5, 1965

3,209,456
BUTTER CUTTING DEVICE
Jean-Baptiste Lozach, Cotes du Nord,
Mael-Pestivien, France
Filed Nov. 15, 1962, Ser. No. 237,947
4 Claims. (Cl. 31—5)

The invention relates to machines for the pre-malaxation of frozen butter which can be used as filtering and mixing machines.

Heretofore cutting-up machines and filtering presses have been used to soften butter which has been in cold storage; these machines were cumbersome and mechanically delicate, and were also uneconomical. Cutting-machines with vertical blades and a horizontal feeding hopper have also been used, but they require that constant pressure be applied to the butter, in spite of the action of centrifugal force, so as to ensure that it moves forward. These latter machines can only be used for very hard butter and can not be used for frozen butters or butters designed by their mixture to form a homogeneous paste.

An object of the invention is to provide an economical machine, which is easy to maintain, has a high production capacity and which can be fitted with different methods of cutting to suit each one of the different consistencies of butter made, and further, which constitutes by this cutting-up a means of malaxation which can be used in conjunction with any mixing machine of an ordinary current type.

Another object of the invention is to provide an auxiliary device making it possible to filter the butter that has been kneaded, so that the whole plant becomes a cutting-up and filtering machine doing the work of two different machines.

According to this invention, the required results are obtained by placing a container open at the top and supported by suitable framework in the fixed casing of the machine. This container moves round in rotation; part of its walls comprise removable cutting gear which can be quickly interchanged, and inside the container there is a fixed counter-cutting blade. When the butter is introduced into the container its own weight brings it in contact with these cutting devices and it is cut up according to its own consistency; the method of cutting-up chosen, for example, very thin small blades and fragments of vermiculite, makes the subsequent malaxation process eaiser.

The container can be cylindrical in shape and the bottom may be removable. The latter can be circular disk fitted with the required cutting devices; the container can be conical and easily taken to pieces, and the wall of the same container can comprise the required cutting devices.

An alternative arrangement to the above consists in fitting under the mobile cutting disk another parallel auxiliary disk fitted with holes. Blades fixed to the cutting are then placed between these two disks, so that the butter once cut-up must pass through the filter, thus making the machine a mixing and filtering machine. When the container is conical in shape, it is placed in a fixed conical hopper on the same axis whose wall is pierced with holes interposed with mobile blades so as to force through the fragments of butter which have been cut up.

Other and further objects of the invention will now be described in detail in the specification and then pointed out more particularly in the appended claims.

FIG. 1 is a longitudinal section of a machine with a cylindrical container with removable round base;

FIGURES 2, 3 and 4 represent different models of cutting-disks adapted to fit onto the base of the container of the machine;

FIGURES 5, 6 and 7 are transversal sections of the various disk models represented in FIGURES 2, 3 and 4;

The machine is composed of a stand 1, a vertical support 2, a fixed casing 3 in which the cutting device is housed and a lateral supporting frame 4 for housing the motor used to drive the turning parts of the mechanism. In the cylindrical casing 3, with circular section, a metal container 5 of stainless steel is mounted; the top part of this container is fitted with a wheel acting as a runner 6, rectangular in section and covered on both sides with rubber plates 6a, or in any other elastic substance. Three or four runner-wheels or rollers 7 on a vertical axis are fitted in the casing 3; they are used to centre the mobile container in the casing, and three or four runner-wheels or rollers 8 on a horizontal axis are also fitted to the said casing; they serve to hold the container in position. And in this way the container can be accurately placed in position without any other mechanical part or tool; assembly and removal are immediate. The outer peripheric part of the upper part of the container takes a driving belt 10 fixed to the other end of a pulley 12 of an electric motor 11 housed in and fixed to the framework. A wiring box has been provided 24 for starting and stopping the machine. The method of drive shown is the smooth belt type, but it is obvious that any other suitable type.

The lower part of the container 5 is fitted with an angle-iron shoulder 25 on which the cutting disk 16 is placed. Two or three perpendicular lugs 26 are provided for fixing this disk; the part of them which sticks out is very small and they end up with a head 27. The disk 16 comprises two or three holes 23 which fit into the corresponding heads of the lugs, and a curved-in hole 22 coming out in the orifice. Only a slight pivoting movement of the disk once it is engaged is enough to ensure proper fixation, and the disk can be removed immediately at any time.

A fixed cylindrical hopper 13 is fitted inside the container 5; it is placed and fixed by means of a circular ring 14 on one of the upper shoulders of the casing 3. This hopper is held in place by means of two or three gudgeon-pins and nuts 28 so that by merely unscrewing the nut and tipping the hopper slightly it is possible to remove it straightaway.

On the lower part of the cylindrical casing 3 a spout 17 is fixed by the same means. This spout is equipped with a shoulder 19, so as to be able to take, when the machine is working as a filtering machine, a removable disk pierced with holes. Between the cutting disk 16 and the filter disk 18 one or several cutting blades 21 are mounted, which compel the cut-up butter to pass though the filter. The spout 17 is provided with an evacuation hole 20, which enables the transformed butter to pass out of the machine and into any suitable recipient.

The fixed hopper 13, made of stainless steel, is provided with a blade 15 adapted to press the lump of butter 9 against the wall of the hopper to prevent rotation of the butter under the action of the rotating cutting disk 16. The blade 15 is secured to the inner wall of the hopper 13 and guides the free fall of the lump 9 of butter.

FIGURES 2 and 5 represent a disk cutting-blades. The cutting elements are preferably not detachable. The round disk is merely cut out radially in such a way that each cut one side should be bevelled at a given angle. The cutting angle may vary; and the space which is free between the two segments may vary also; the number of segments may vary: two, three or four blades or more can be fitted in certain cases. The machine will therefore comprise additional equipment and tools making it possible to adapt to the machine the best disk for cutting the butter to be treated.

FIGURES 3 and 6 concern a disk 29 pierced with holes in such a way that the surface on one side is rough and stands out 30. The disk made in this way acts like a rasp, breaking the butter up into short particles.

FIGURES 4 and 7 represent a disk 31 with holes 32 so that the two sides of the disk are smooth giving to the fragments a vermicular shape. Naturally all the disks have the same means for attachment and fixing as the ones which have already been described, but the fixing means might well be different; the main thing is that they must make it possible to replace and remove the disks without the use of any mechanical tightening or fixing part which could involve loss of time.

What I claim is:

1. A machine for cutting frozen butter or the like substance into fragments thereof, comprising:
    (a) a hollow stationary casing;
    (b) a cylindrical container mounted for rotation in said hollow casing;
    (c) cutting means removably secured to the bottom of said rotatable container so as to rotate therewith; said cutting means having apertures to allow fragments to pass therethrough;
    (d) a hopper mounted within said rotatable container to guide the substance in free fall toward said cutting means;
    (e) means securing said hopper to said casing to prevent rotation of the said hopper; and
    (f) means within said stationary hopper and fixed thereto for pressing a lump of the substance to be cut against the wall of said hopper to prevent rotation of said lump under the impelling force of the rotating disk against which said lump rests by its own weight.

2. A machine for cutting frozen butter or the like substances into fragments thereof, comprising:
    (a) a hollow open-top stationary casing;
    (b) an open-top and open-bottom cylindrical container mounted for rotation in said hollow casing;
    (c) a cutting disk provided with cutting apertures therethrough; said disk being removably secured to the bottom of said container so as to rotate therewith;
    (d) an open-top and open-bottom cylindrical hopper mounted within said rotatable container and terminating short of said cutting disk; said hopper adapted to guide a lump of the substance inserted through said hopper open-top in free fall toward said cutting disk;
    (e) means securing said hopper to said casing to prevent rotation of the said hopper; and
    (f) a pressure blade secured to said stationary hopper for pressing said lump of the substance to be cut into fragments thereof against the wall of said hopper to prevent rotation of the said lump under the impelling force of the rotating disk against which said lump rests by its own weight.

3. A machine as claimed in claim 2, wherein said cutting apertures are radial angular slits, one radial edge of which is formed as a cutting edge.

4. A machine as claimed in claim 2, wherein said cutting apertures are holes; rough projections upstanding from around said holes on the surface of the disk in contact with the substance to be cut; said roughened surface thus acting as a rasp.

References Cited by the Examiner

UNITED STATES PATENTS

| | | | |
|---|---|---|---|
| 625,215 | 5/99 | Tice | 31—5 X |
| 2,496,780 | 2/50 | Nardis et al. | 146—124 X |
| 2,801,665 | 8/57 | Hortragl | 146—124 X |
| 2,856,976 | 10/58 | MacDougall | 146—177 X |

SAMUEL KOREN, *Primary Examiner.*

CARL W. ROBINSON, HUGH R. CHAMBLEE, *Examiners.*